Figure 1:
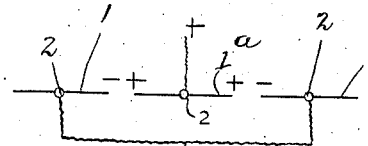

Aug. 24, 1926.

A. T. STUART

CELL

Filed June 29, 1925   2 Sheets-Sheet 1

1,597,553

Alexander T. Stuart
per Chas H Riches
attorney.

Aug. 24, 1926.
A. T. STUART
CELL
Filed June 29, 1925
1,597,553
2 Sheets-Sheet 2
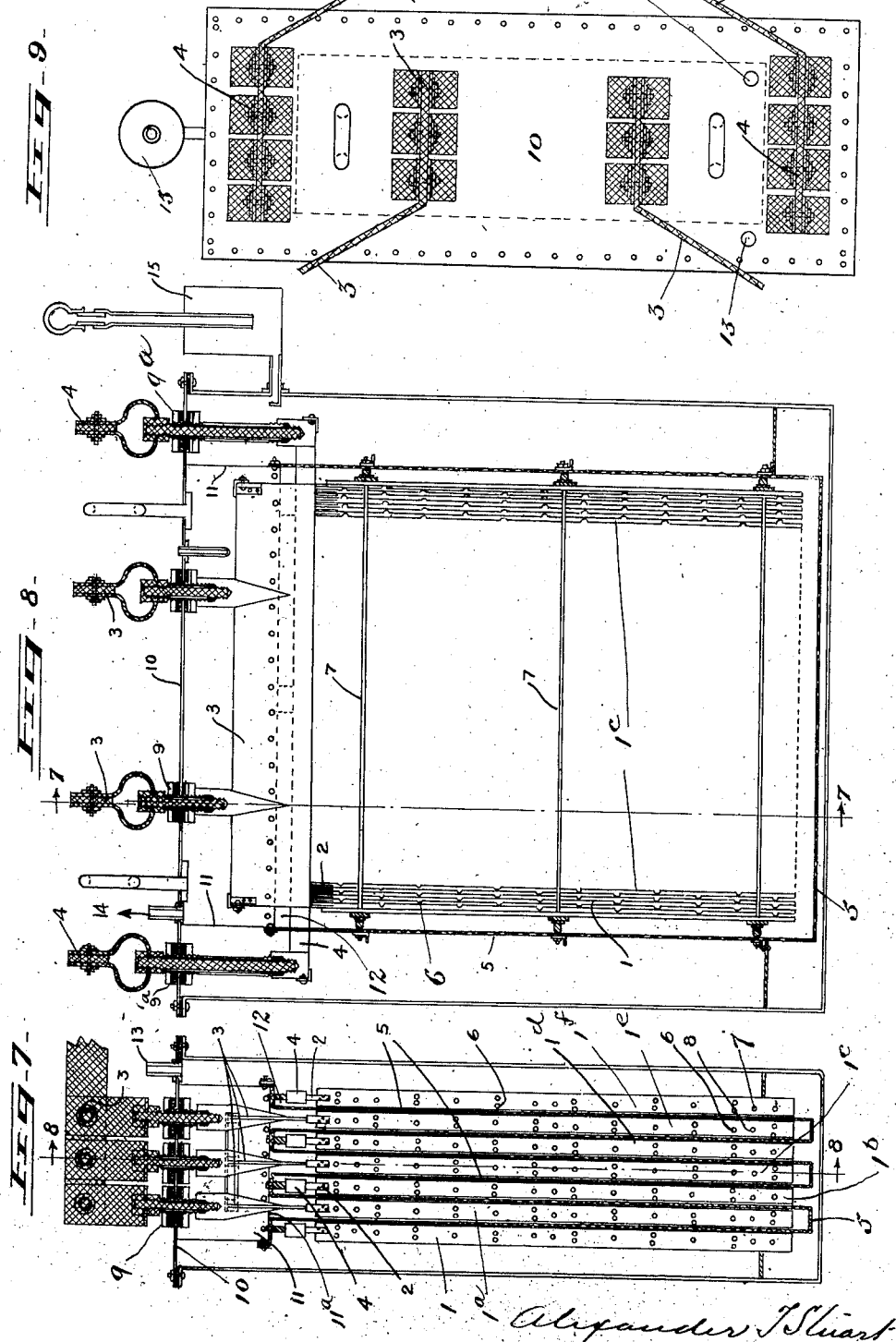

Patented Aug. 24, 1926.

1,597,553

UNITED STATES PATENT OFFICE.

ALEXANDER THOMAS STUART, OF TORONTO, ONTARIO, CANADA.

CELL.

Application filed June 29, 1925. Serial No. 40,368.

My invention relates to a cell characterized: (a) by an electrode which has its major surface in the same direction as the current through the electrolyte, so that opposite ends of its major surface may similarly function and the current at one end of its major surface may flow in an opposite direction to the current at the other end when the electrode is interposed between, and laterally spaced from, two other electrodes of polarity opposite to that of the interposed electrode; (b) by two electrodes of the same same polarity each having its major surface in the same direction as the circuit across the intervening spaces, and an electrode of opposite polarity interposed between the other two; (c) by two electrodes of the same polarity, and an interposed electrode of opposite polarity to the other two each having its major surface in the same direction as the circuit across the intervening spaces; whereby large areas of such electrode surfaces may be provided in a single cell, of relatively small cubic dimensions, in such intimate relation that they actively operate at low voltage and obtain maximum quantity production and thereby maximum efficiency at low operating cost.

A convenient method of providing these large areas of active electrode surfaces is to arrange any desired number of electrodes, of the same polarity, in parallel or substantially parallel formation and connect them as a group. One of such groups may be assembled between, and spaced from, two other electrodes of polarity opposite to its polarity with the major surface of each electrode of the group in the same direction as the circuit across the spaces intervening between electrodes of opposite polarity or two or more such groups may be placed in the cell with the major surfaces of the electrodes of each group set end to end and preferably in alignment with the major surfaces of the corresponding electrodes of the adjoining group or groups and the ends of the electrode surfaces of each group separated from the ends of the electrode surfaces of the adjoining group or groups by intervening spaces for the interposition of a diaphragm and for the prevention of short circuits.

A cell constructed according to my invention may comprise any number of electrodes or electrode groups which, without restricting the use or its construction to the following particulars, may be made from sheet metal about 0.02 inches in thickness sheared into strips 1.5 inches wide by 60 inches high and subsequently stamped to form spacing buttons approximately 0.1 inch deep. Each strip, at the top and intermediate of its lateral edges may be attached to a terminal about 0.1 inch by 0.5 inches in cross section, and these strips may be suspended vertically in the electrolyte from these terminals. Any number of groups of these electrode surfaces may be used in the cell structure and for the purpose of explaining the invention and as a basis for my calculations I have illustrated a cell containing 13 groups of such electrodes. The electrodes of each group may be spaced laterally about 0.1 inch apart with 0.1 inch space between groups. Each group may comprise 600 strips—or a total of 7,800 electrodes in the 13 groups, and in a cell which is approximately 2 feet wide by 6 feet long by 6 feet high, the total superficial area of the diaphragms between groups, there being 12 diaphragms, will be 300 square feet and the total superficial electrode surface will be 9,750 square feet, or some 32.5 times the area of the diaphragms. Nothing is suspended in the electrolyte except these low cost electrodes and the diaphragms necessary to the separation of the gases and consequently the electrolyte can circulate with the greatest freedom. In a cell for the electrolysis of water this arrangement of electrodes reduces the internal resistance to a minimum and the large surfaces combined with the free circulation of the electrolyte practically eliminate polarization by gas bubbles, while the spaces between the strips allow the ready egress of the gases and the "gas lift effect" maintains an active circulation of the electrolyte up the surfaces of the electrodes.

A battery of these cells may be housed together to conserve the heat so that by suitable regulation of the air vents between cells the temperature of the cells may be maintained at any desired degree. I have found it practicable to operate the cells at approximately 65° C. At this temperature the following results have been obtained:

| Volts per cell. | Efficiency per cent. | Cu. ft. per 1 k. w. h. | Amperes per sq. ft. of diaphragm. | Cu. ft. gases per hour per 1 sq. ft. diaphragm. | | |
|---|---|---|---|---|---|---|
| | | | | H. | O. | Total H and O. |
| 1.6 | 93.75 | 15.0 | 20 | .32 | .16 | .48 |
| 1.7 | 88.89 | 14.22 | 40 | .64 | .32 | .96 |
| 1.8 | 83.33 | 13.33 | 80 | 1.28 | .64 | 1.92 |
| 1.9 | 78.95 | 12.63 | 110 | 1.76 | .88 | 2.64 |
| 2.0 | 75.0 | 12.0 | 165 | 2.64 | 1.32 | 3.96 |
| 2.1 | 71.43 | 11.43 | 215 | 3.44 | 1.72 | 5.16 |

In a cell construction as above described the cost per 1 sq. ft. of diaphragm superficial area has been so reduced that it becomes commercially feasible, when electric power is costly, to operate these cells at 1.6 volts or 93.75% electrical efficiency resulting in the production up to 15 cu. ft. of gases per 1 k. w. h. consumed and a large gas production per 1 sq. ft. of diaphragm area. The particular cell previously described having 300 square feet of diaphragm area will therefore, operate as follows:

At 1.6 volts 6,000 amperes or 144 c. f. total gas production per 1 hour.

At 1.7 volts 12,000 amperes or 288 c. f. total gas production per 1 hour.

Heretofore, on account of costs of construction as well as on account of small capacity for gas production at low voltage, it has not been commercially feasible to operate the cell at voltages lower than 2.2 volts or at efficiencies higher than 68.2% and with the production of more than 10.91 c. f. total gas per 1 k. w. h.

There are other cases where the cost of electric energy is a small factor, such as in the utilization of off-peak capacity on water power plants or using electrical energy at the site of the plant. In such cases it is not necessary to operate cells at high degrees of efficiency and it may be desirable, in order to reduce the capital cost, to use cells having perhaps only 50 sq. ft. of diaphragm area and which will produce as much gas as the larger cell described, but at lower efficiencies. A cell containing 50 sq. ft. will operate as follows:

At 1.8 volts 4,000 amps. or 96 c. f. total gas production per 1 hour.

At 1.9 volts 5,500 amps. or 132 c. f. total gas production per 1 hour.

At 2.0 volts 8,250 amps. or 198 c. f. total gas production per 1 hour.

At 2.1 volts 10,750 amps. or 258 c. f. total gas production per 1 hour.

Heretofore, one of the great obstacles in cell operation has been the corrosion of electrodes, and not only has it been necessary and costly to provide for replacement of anodes at regular intervals but the corroded material has caused short circuits and other troubles. I have found that I can obviate all troubles in this direction by operating at low voltages described and by the special arrangement of the electrodes.

The advantage of my electrode construction, positioning and electrical connection is that I can assemble in a single cell, of relatively small cubic dimensions, large areas of electrode surfaces, in such intimate relation that all these surfaces actively operate in the process and produce results as above described. I can obtain much higher electrical efficiencies and greater capacities, at lower capital cost, by placing, alternately, electrode surfaces of opposite polarity end to end with their major surfaces in the same direction as the circuit across the intervening spaces and with both ends of each electrode surface similarly functioning, than it is possible to obtain by any other known electrode arrangement.

Figure 2:
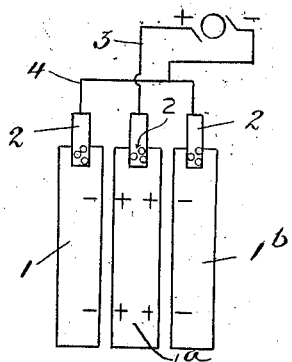
Figure 3:
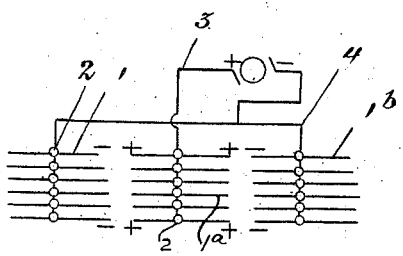
Figure 4:
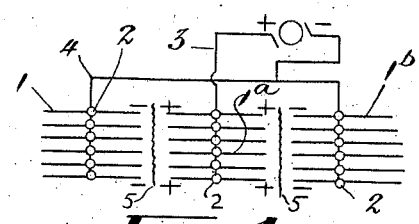
Figure 5:
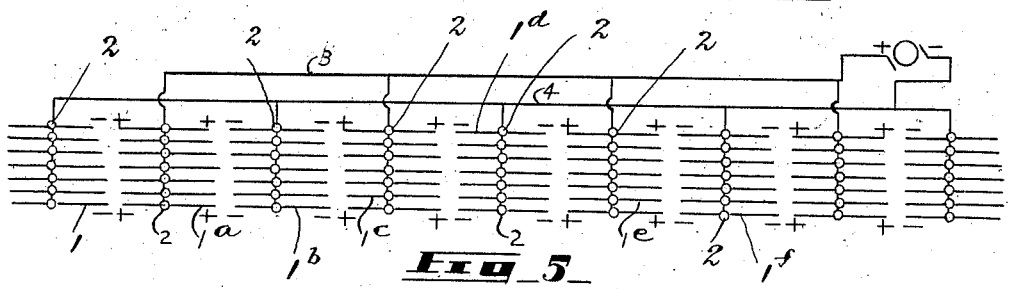

In the drawings:

Fig. 1 is a diagrammatic plan of three electrodes, with their major surfaces arranged in the same direction as the circuit across the intervening spaces with opposite ends of the interposed electrode surface similarly functioning, Fig. 2 is a diagrammatic side elevation of the construction shown in Fig. 1, Fig. 3 is a diagrammatic plan of a plurality of groups of electrodes, Fig. 4 is a diagrammatic plan similar to Fig. 3 with diaphragms between the lateral edges of adjoining groups, Fig. 5 is a diagrammatic plan of a multiplicity of groups of parallel electrodes, the electrodes of alternate groups being electrically connected with one pole, and the electrodes of the other groups being electrically connected with the other pole.

Figure 6:
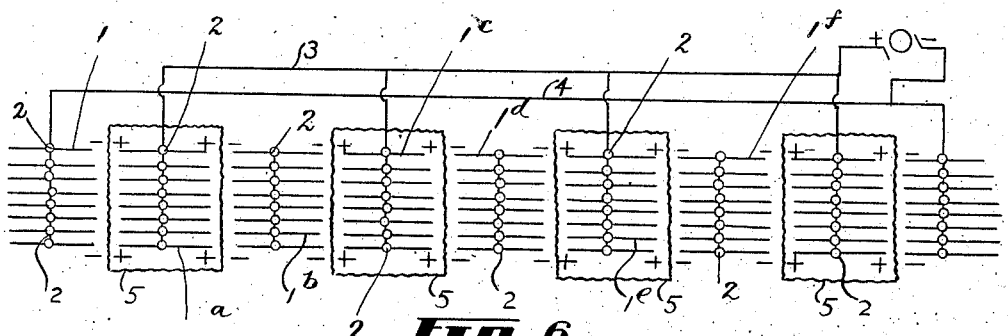

Fig. 6 is a view similar to Fig. 5 showing how groups of one polarity may be encircled by diaphragms, Fig. 7 is a detailed vertical sectional view of a separate unit oxygen-hydrogen cell, illustrating the preferred method of assembling, the section being taken on the line 7—7 of Fig. 8, Fig. 8 is a detailed horizontal sectional view on the line 8—8 of Fig. 7, and Fig. 9 is a plan view of the cover of the cell, showing how the terminals are arranged.

According to my invention the electrodes 1, $1^a$, $1^b$, $1^c$, $1^d$, $1^e$, $1^f$, are alternately arranged as positive electrodes and negative electrodes and are set edge to edge in the cell with their major surfaces in the same direction as the circuit of the current through the electrolyte. By this assembly the current circuits across the intervening spaces or electrolytic gaps, between electrodes of opposite polarity, and opposite ends of the major surface of each electrode then similarly function and the current at one end of each major surface flows in an opposite direction to the current at the other end. In the drawings I have shown each electrode to consist of a relatively narrow and thin metal strip but I do not propose to limit the invention to that construction as electrodes taking the form of reticulated, fluted, laminated, ribbed, or projecting structures such as conducting wires, gauzes, bars, rods, plates, tubes and the like may be substituted for and arranged in the same way as the thin metal strips.

As shown in Figs. 1 to 8 inclusive any number of electrodes of like polarity may be arranged as a group, and such groups are alternately arranged as positive electrodes and negative electrodes. When electrodes are assembled or arranged as a group, the electrodes of each group are spaced apart by buttons 6, suitably staggered, and are tied together by tie rods 7 entered through holes 8 in the electrodes. The electrodes of each group are electrically connected to a conductor and for this purpose each electrode is provided, interjacent its edges, with an electrical contact or terminal 2. The terminals of all the positive electrodes are connected to conductors 3 and the terminals of all the negative electrodes are connected to conductors 4 which in turn are supported from the cell cover 10 by collars or lock nuts 9, 9ª respectively.

By this construction the electrodes can be suspended below the level of the electrolyte and when used in an oxygen-hydrogen cell, each group of electrodes of one polarity can be conveniently encircled by a diaphragm 5, open at the top, which passes through, and approximately fill, the space intervening between adjoining groups for isolating the gas made within the diaphragm from the gas made outside it. A gas compartment 11 is attached to the under side of the cell cover 10 and is formed with flanged openings 11ª through which the gas enters the compartment. The diaphragms 5 are suspended from the base of the gas compartment 11 and enclose the flanged openings 11ª so that the gas made within the diaphragms can enter the compartment. Between the flanged openings 11ª are horizontal channels 12 for conducting the gas, made outside the diaphragms, laterally to either side of the gas compartment, where it rises to the cell cover 10.

From the compartments 11 is a tubular duct 13 and from the cell area exterior of the compartment is a duct 14 to conduct the gases to separate mains. Electrolyte and feed water may be supplied to the cell from the reservoir 15.

Electric current, supplied by means of the conductor 3 and terminals 2 to the positive groups, circuits outwardly from each terminal, over the entire body, and flows in opposite directions from both edges, of each positive electrode, interposed between two negative electrodes, and across the electrolytic gaps, or intervening spaces to the adjacent negative electrodes. Each negative electrode, interposed between two positive electrodes, receives at both edges, the current circuiting across the electrolytic gaps. The current flows inwardly from both edges, and in opposite directions over the entire body, of each negative electrode to its respective terminal and conductor 4.

The electrodes are preferably made of metal of such cross section that the resistance to the flow of the current is negligible as compared with the resistance across the electrolytic gaps, and when positive and negative electrodes are alternately arranged in the cell and set edge to edge and uniformly spaced, the current will divide at the median line of each positive electrode and flow outwardly and approximately equally and uniformly to its opposite ends or edges, across the electrolytic gaps to the adjacent ends or edges of the negative electrodes, and then inwardly from the edges, to the median line, of each interposed negative electrode approximately equally and uniformly. Thus the opposite edges or ends of the major surface of each positive electrode interposed between two negative electrodes similarly function, and likewise the opposite edges or ends of the major surface of each negative electrode interposed between two positive electrodes similarly function.

As there is only a negligible drop in voltage over each electrode surface and the potential across the electrolytic gaps is approximately the same throughout the extent of each electrode surface, opposite edges of both the positive and negative electrodes produce equivalent amounts of gas.

Oxygen is generated on all positive surfaces but more intensely at the edges and surfaces adjacent to the diaphragm. In the illustration the oxygen is generated within the encircling diaphragms open at the top, and enclosing the flanged openings of the oxygen compartment. Hydrogen is generated on all negative surfaces and is collected outside the oxygen compartment.

The electrolyte freely circulates as a result of the electrode construction and the gas lift effect of the gas bubbles, the circulation being rapidly upward between the spaced electrodes to the level above them, thence laterally in both directions to the ends of the groups of electrodes, thence down and beneath the groups to the spaces between electrodes.

From the foregoing description it follows that each electrode being relatively narrow its entire surface is active and opposite ends of each electrode surface of each interposed group similarly function and equal currents flow in opposite directions at both ends of each interposed electrode surface and therefore, each electrode is capable of doing double the work that it would perform if only one end of the electrode surface were functioning.

The term "major surface" as used throughout the description and claims relates to the superficial area of a single electrode member, in contradistinction to the cross sectional area of a group of such members.

The term "opposite ends" as used throughout the specification and claims is intended to mean the boundaries opposed to corresponding boundaries of the adjacent electrodes.

Having thus fully described my invention what I claim as new and desire to secure by Letters Patent is:

1. A cell for the electrolysis of water comprising an electrode having its major surface in the same direction as the circuit through the electrolyte, opposite ends of its major surface similarly functioning and the current at one end flowing in an opposite direction to the current at the other end, in combination with two electrodes of opposite polarity at the extremities of the major surface of the first mentioned electrode and spaced therefrom by electrolytic gaps.

2. In a cell an electrode having its major surface in the same direction as the circuit through the electrolyte, opposite ends of its major surface similarly functioning and the current at one end flowing in an opposite direction to the current at the other end.

3. In a cell, electrodes spaced apart one of which has its major surface in the same direction as the circuit across the intervening spaces, opposite ends of its major surface similarly functioning and the current at one end flowing in an opposite direction to the current at the other end.

4. In a cell electrodes spaced apart, one of which has its major surface in the same direction as the circuit across the intervening spaces, opposite ends of said surface similarly functioning, and the current at one end of said surface flowing in an opposite direction to the current at the other end.

5. In a cell two electrodes of the same polarity and an electrode of opposite polarity placed between the other two with its major surface in the same direction as the circuit across the spaces between the electrodes.

6. In a cell two electrodes of the same polarity and an electrode of opposite polarity placed between the other two with its major surface in the same direction as the circuit across the spaces between the electrodes and having the opposite ends of the major surface similarly functioning.

7. In a cell two electrodes of the same polarity and an electrode of opposite polarity placed between the other two with its major surface in the same direction as the circuit across the intervening spaces and the current at one end of the major surface flowing in an opposite direction to the current at the other end.

8. In a cell two electrodes of the same polarity and an electrode of opposite polarity placed between the other two with its major surface in the same direction as the circuit across the intervening spaces and the opposite ends of the major surface similarly functioning and opposed to the first two mentioned electrodes.

9. In a cell two electrodes of opposite polarity set edge to edge with their major surfaces in the same direction as the circuit across the intervening spaces and both opposite extremities of each electrode surface similarly functioning for causing the flow of the current laterally outward from the extremities of one of said electrode surfaces and laterally inward from the extremities of the other.

10. In a cell two electrodes of the same polarity and an electrode of opposite polarity placed between the other two, all of said electrodes being set edge to edge with their major surfaces in the same direction as the circuit across the intervening spaces and both lateral edges of the interposed electrode similarly functioning for the flow of the current at one lateral edge in an opposite direction to the current at the other lateral edge.

11. In a cell two electrodes of the same polarity and an electrode of opposite polarity placed between them with its major surface in the direction of the current across the electrolytic gaps.

12. A cell comprising an electrode arranged with its major surface in the same direction as the circuit through the electrolyte and connected for the flow of the current at one of its lateral edges in an opposite direction to the current at the other edge.

13. A cell comprising a group of electrodes of the same polarity arranged with their major surfaces in the same direction as the circuit across the electrolytic gaps and connected for the flow of the current at one lateral edge in an opposite direction to the current at the other lateral edge, and two other electrodes opposed to the lateral edges of the first mentioned electrodes.

14. A cell comprising an electrode arranged with its major surface in the same direction as the circuit across the electrolytic gaps and connected for the flow of the current at one of its lateral edges in an opposite direction to the current at the other lateral edge, and two other electrodes of opposite polarity to the first mentioned electrode opposed to said lateral edges.

15. A cell comprising two groups of electrodes of the same polarity and a group of electrodes of opposite polarity placed between the other two groups with the major surface of each electrode of each group in the same direction as the circuit across the electrolytic gaps and both lateral edges of the interposed electrode similarly functioning.

16. A cell comprising two groups of electrodes of the same polarity and a group of electrodes of opposite polarity placed between the other groups with the major surface of each electrode of each group in the same direction as the circuit across the spaces between groups, both lateral edges of each electrode of the interposed group similarly functioning, and the current at one of said lateral edges flowing in an opposite direction to the current at the other edge.

17. In a cell two or more groups of electrodes, each group comprising a plurality of electrodes in parallel and spaced relation and of the same polarity with the major surface of each electrode of each group in the same direction as the circuit through the electrolyte and each interposed electrode having both its lateral edges similarly functioning.

18. In a cell two or more groups of electrodes each group comprising a plurality of electrodes in parallel and spaced relation and of the same polarity with the major surface of each electrode of each group in the same direction as the circuit through the electrolyte, each interposed electrode having both its lateral edges similarly functioning, and the current at one lateral edge flowing in an opposite direction to the current at the other edge.

19. A cell comprising two electrodes of opposite polarity arranged with their major surfaces in the same direction as the circuit, and each connected for the flow of the current at one of its lateral edges in an opposite direction to the current at the other edge.

20. In a cell two electrodes of the same polarity with the major surface of each of the electrodes in the same direction as the circuit across the spaces between electrodes, and an electrode of opposite polarity placed between the other two.

21. In a cell two groups of electrodes of the same polarity, each group comprising a plurality of electrodes in parallel and spaced relation, with the major surface of each electrode of each group in the same direction as the circuit across the spaces between groups, and an electrode of opposite polarity interposed between said groups.

22. In a cell for the electrolysis of water, two electrodes of one polarity and an electrode of opposite polarity interposed between, set edgewise with, and separated by electrolytic gaps from, the other two, each electrode comprising a metal strip suspended vertically in the electrolyte and the interposed electrode having its opposite edges similarly functioning with the current at one edge flowing in an opposite direction to the current at the other edge.

23. In a cell, an electrode comprising a thin metal strip suspended vertically in the electrolyte having its major surface adjacent its two vertical edges substantially in the same direction as the flow of the current in the electrolyte and both of its vertical edges similarly functioning and the current at one edge flowing in an opposite direction to the current at the other edge.

24. A cell for the electrolysis of water comprising two electrodes of one polarity and an electrode of opposite polarity interposed between the other two, the interposed electrode comprising a plurality of electrically connected metal strips suspended vertically in the electrolyte and set edgewise towards the first mentioned electrodes, the vertical edges of the interposed electrode, which are adjacent the first mentioned electrodes, similarly functioning.

Dated at the said city of Toronto, this 25th day of June, A. D. 1925.

ALEXANDER THOMAS STUART.